United States Patent
Liu et al.

(10) Patent No.: US 9,817,508 B2
(45) Date of Patent: Nov. 14, 2017

(54) DISPLAY DEVICE AND METHOD FOR DRIVING THE SAME

(71) Applicants: Boe Technology Group Co., Ltd., Beijing (CN); Beijing Boe Optoelectronics Technology Co., Ltd., Beijing (CN)

(72) Inventors: Wei Liu, Beijing (CN); Xue Dong, Beijing (CN); Haisheng Wang, Beijing (CN); Xiaoliang Ding, Beijing (CN); Shengji Yang, Beijing (CN); Yingming Liu, Beijing (CN); Hongjuan Liu, Beijing (CN); Weijie Zhao, Beijing (CN); Changfeng Li, Beijing (CN)

(73) Assignees: BOE TECHNOLOGY GROUP CO., LTD., Beijing (CN); BEIJING BOE OPTOELECTRONICS TECHNOLOGY CO., LTD., Beijing (CN)

( * ) Notice: Subject to any disclaimer, the term of this patent is extended or adjusted under 35 U.S.C. 154(b) by 0 days.

(21) Appl. No.: 14/907,876

(22) PCT Filed: Aug. 13, 2015

(86) PCT No.: PCT/CN2015/086861
§ 371 (c)(1),
(2) Date: Jan. 27, 2016

(87) PCT Pub. No.: WO2016/155192
PCT Pub. Date: Oct. 6, 2016

(65) Prior Publication Data
US 2017/0038885 A1    Feb. 9, 2017

(30) Foreign Application Priority Data
Mar. 30, 2015    (CN) .......................... 2015 1 0145784

(51) Int. Cl.
*G02F 1/1343* (2006.01)
*G06F 3/041* (2006.01)
(Continued)

(52) U.S. Cl.
CPC ....... *G06F 3/0416* (2013.01); *G02B 27/2214* (2013.01); *G02F 1/1343* (2013.01);
(Continued)

(58) Field of Classification Search
CPC .... G02F 1/1343; G02F 1/155; G02F 1/13338; G02F 1/163; G06F 3/0416; G06F 3/0412; G06F 2203/04107; G02B 27/2214
See application file for complete search history.

(56) References Cited

U.S. PATENT DOCUMENTS

2006/0087499 A1    4/2006  Chen et al.
2007/0085837 A1*   4/2007  Ricks .................. G02F 1/13338
                                               345/173
2014/0362314 A1*  12/2014  Guo .................... G02B 27/2214
                                                349/15

FOREIGN PATENT DOCUMENTS

CN          102540607        7/2012
CN          102750027       10/2012
(Continued)

OTHER PUBLICATIONS

International Search Report and Written Opinion from PCT/CN15/086861 dated Dec. 4, 2015.
(Continued)

*Primary Examiner* — Charles Hicks
(74) *Attorney, Agent, or Firm* — Calfee, Halter & Griswold LLP

(57) ABSTRACT

The present invention discloses a display device and a driving method thereof. The display device comprises a display panel, a grating, a voltage generating unit, a touch
(Continued)

sensing unit and a control unit. The grating comprises a first electrode and a second electrode having a p plurality of electrode blocks. The voltage generating unit provides first and second voltages to the first and second electrodes, respectively. The control unit controls the values of the first, second voltages such that the grating is transparent during the 2D display phase and functions well during the 3D display phase. During a touch phase, the electrode blocks serve as touch electrodes so as to provide a touch function together with the touch sensing unit. Since the second electrode is used during both the display phase and the touch phase, the display device has a reduced thickness, lower costs and enhanced transmittance.

20 Claims, 2 Drawing Sheets

(51) Int. Cl.
G02F 1/155 (2006.01)
G02F 1/1333 (2006.01)
G02B 27/22 (2006.01)
G02F 1/163 (2006.01)

(52) U.S. Cl.
CPC .......... *G02F 1/13338* (2013.01); *G02F 1/155* (2013.01); *G02F 1/163* (2013.01); *G06F 3/0412* (2013.01); *G06F 2203/04107* (2013.01)

(56) References Cited

FOREIGN PATENT DOCUMENTS

| | | |
|---|---|---|
| CN | 103293778 | 9/2013 |
| CN | 103309094 | 9/2013 |
| CN | 104020891 | 9/2014 |
| CN | 104122671 | 10/2014 |
| CN | 203950289 | 11/2014 |
| CN | 104181742 | 12/2014 |
| CN | 1043130520 | 2/2015 |
| CN | 104391392 | 3/2015 |
| CN | 104698663 | 6/2015 |
| JP | 2012078767 | 4/2012 |

OTHER PUBLICATIONS

Office Action from China Application No. 201510145784.1 dated Feb. 17, 2017.
Second Office Action from China Application No. 201510145784.1 dated Jul. 24, 2017.

* cited by examiner

DISPLAY DEVICE AND METHOD FOR DRIVING THE SAME

RELATED APPLICATION

The present application is the U.S. national phase entry of PCT/CN2015/086861, with an International filing date of Aug. 13, 2015, which claims the benefit of Chinese Patent Application No. 201510145784.1, filed Mar. 30, 2015, the entire disclosures of which are incorporated herein by reference.

FIELD OF THE INVENTION

The present invention relates to the field of display technology, and more particularly to a display device and a method for driving the same.

BACKGROUND ART

A stereo display (also 3D display) technology is basically to obtain two images of the same object from different perspectives on the basis of the human vision, and project the two images into the left and right eyes respectively to thereby produce the image disparity between the left and right eye images. The brain synthesizes the left and right eye images with disparity to thereby lead to depth perception. In such a way a three-dimensional display effect is produced.

The current 3D display technology is mainly divided into a glasses type and a naked-eye type. For the glasses type 3D display technology, the use of specialized glasses is required, which is not convenient to use with portable devices. For mobile electronic products, the naked-eye type 3D display technology is more commonly utilized. The naked-eye type 3D display technology mainly comprises a lenticular lens type and a grating type of the naked-eye type 3D display technology, among which the latter is used in most cases. Currently, a 3D display device with a touch function mostly comprises a display panel, a grating and a touch module, which are mutually independent and arranged in a certain way to achieve 3D display and touch functions. As a result, the 3D display device with the touch function has the disadvantages of increased thickness, low transmittance, and high production cost. Thus, a highly-integrated 3D display device with a touch function is urgently desired to solve the above technical problems.

SUMMARY OF THE INVENTION

The technical problems addressed by the present invention comprise, aiming at the above problems of the prior display devices, providing a display device with reduced thickness, lower cost and improved aperture ratio, as well as a method for driving the same.

To address or alleviate at least one defect in the prior art, a display device is provided according to one aspect of the present invention, which comprises a display panel and a grating mating with the display panel. The display device further comprises a voltage generating unit, a touch sensing unit and a control unit. The grating comprises a first electrode and a second electrode having a plurality of electrode blocks, which are sequentially arranged at the light-emitting side of the display panel. The voltage generating unit is configured to provide a first voltage to the first electrode and a second voltage to the second electrode. The control unit is configured to control the values of the first voltage and the second voltage generated by the voltage generating unit such that the grating is in a transparent state during the 2D display phase and is shown as alternately arranged light-shielding areas and light-transmitting areas during the 3D display phase. During a touch phase, the touch sensing unit is configured to provide touch scanning signals to the electrode blocks of the second electrode under the control of the control unit, and to determine a touch position according to the feedback signals provided by the electrode blocks.

Optionally, the grating comprises, at the position of the light-shielding areas between the first electrode and the second electrode, electrochromic layers which are in a transparent state during the 2D display phase and are in a light-shielding state during the 3D display phase.

Optionally, the display panel comprises a plurality of pixel units arranged in rows and columns, and the electrochromic layer has a width that is the same as that of the pixel unit and is arranged in a position corresponding to that of the pixel unit in the vertical direction.

Optionally, the plurality of electrode blocks comprised in the second electrode are arranged in rows and columns with each electrode block being connected with the touch sensing unit by a single lead.

Optionally, the gap between any two adjacent columns of the electrode blocks corresponds to that between two adjacent columns of the pixel units, and the leads that are connected with the electrode blocks in the same column are arranged in the gap between two adjacent columns of the electrode blocks.

Optionally, during the touch phase, the touch sensing unit inputs the touch scanning signals into each column of the electrode blocks in turn, wherein when the touch scanning signals are input into one column of the electrode blocks, the rest columns of the electrode blocks are maintained at the second voltage.

Optionally, the display device further comprises an on/off switch unit.

The on/off switch unit is configured to, under the control of the control unit, transmit the second voltage provided by the voltage generating unit to the second electrode, or the touch scanning signals output by the touch sensing unit to the second electrode.

Optionally, the voltage generating unit comprises a first voltage generating module and a second voltage generating module. The first voltage generating module is configured to generate the first voltage for the first electrode. The second voltage generating module is configured to generate the second voltage for the second electrode.

Optionally, during the 2D display phase, the value of the first voltage is equal to that of the second voltage; and during the 3D display phase, the value of the first voltage is not equal to that of the second voltage.

Optionally, the first voltage is a planar voltage.

To address or alleviate at least one defect in the prior art, a method for driving any one of the display devices as stated above is provided according to another aspect of the present invention, the method comprising the steps of:

during the display phase, inputting a first voltage to a first electrode and inputting a second voltage to a second electrode, and achieving a 2D or 3D display by controlling the values of the first and second voltages;

during the touch phase, providing touch scanning signals to the electrode blocks of the second electrode, and determining a touch position according to feedback signals provided by the electrode blocks.

Optionally, the touch phase comprises the step of inputting the touch scanning signals to each column of the electrode blocks in turn, wherein when the touch scanning signals are input into one column of the electrode blocks, the second voltage is input into the rest columns of the electrode blocks.

The present invention can achieve at least one of the following advantageous effects and/or other advantageous effects:

The display device according to an embodiment of the present invention can not only provide 2D and 3D display, but also have a touch function. In particular, the second electrode of the display device is used to adjust the light-shielding areas of the grating so as to switch between 2D and 3D display, and meanwhile is also used to realize the touch function of the display device, that is to say, the second electrode also acts as a touch electrode (self-capacitance electrode). Thus, the second electrode functions as both a display electrode and a touch electrode and has the advantages of reduced thickness, lower cost and enhanced transmittance in comparison with the prior display devices having 2D, 3D and touch display functions.

The method for driving the display device according to an embodiment of the present invention is simple in time sequencing and easy to control.

BRIEF DESCRIPTION OF DRAWINGS

To explain the technical solutions in the embodiments of the present invention more clearly, the drawings to be used in the embodiment description will be briefly introduced below. It should be realized that the following drawings are only related to some embodiments of the present invention. Those skilled in the art can obtain other drawings according to these drawings without making an inventive effort.

Figure 1:
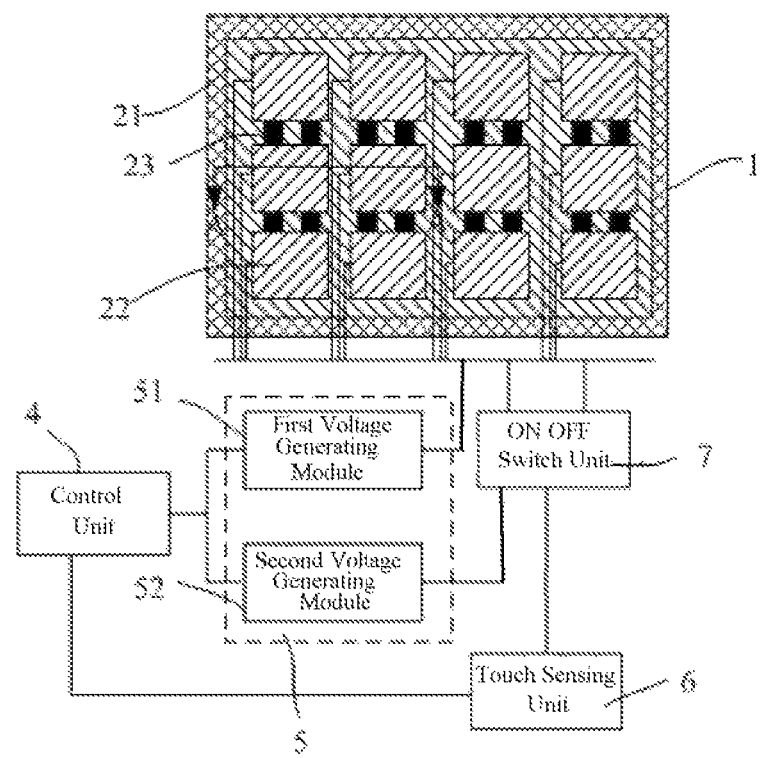
FIG. 1 is a structural schematic view of a display device according to an embodiment of the present invention.

The reference numerals comprise: 1, display panel; 11, array substrate; 12, colour film substrate; 13, liquid crystal molecule; 2, grating; 21, first electrode; 22, second electrode; 23, electrochromic layer; 3, glass of cover plate; 4, control unit; 5, voltage generating unit; 51, first voltage generating module; 52, second voltage generating module; 6, touch sensing unit; and 7, an on/off switch unit.

DETAILED DESCRIPTION OF THE INVENTION

To assist those skilled in the art in better understanding the object, technical solutions and advantages of the present invention, the present invention will be further described in detail with reference to drawings and embodiments.

Figure 2:
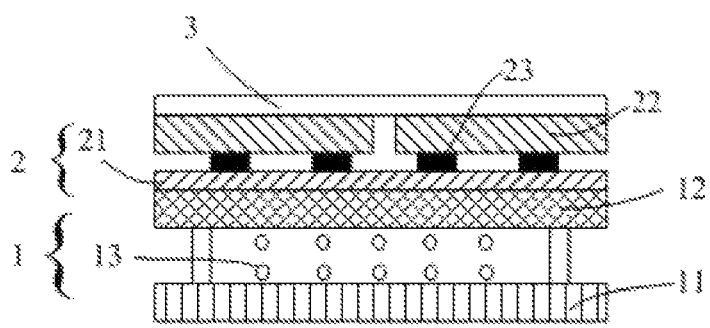
FIG. 2 is a cross-sectional view of the display device in FIG. 1 taken along line A-A.

With reference to FIGS. 1 and 2, a display device is provided according to an embodiment of the present invention, which may comprise a display panel 1 and a grating 2 mating with the display panel 1. The grating 2 can be divided into light-shielding areas and light-transmitting areas, which are alternately arranged. The grating 2 may comprise a first electrode 21, electrochromic layers 23 arranged in a position corresponding to the light-shielding areas, and a second electrode 22 having a plurality of electrode blocks, which are sequentially arranged at the light-emitting side of the display panel 1. In other embodiments, the grating 2 may also be formed in other different ways. The display device can also comprise a voltage generating unit 5, a touch sensing unit 6 and a control unit 4. The voltage generating unit 5 is configured to provide a first voltage to the first electrode 21 and a second voltage to the second electrode 22. The control unit 4 is configured to control the values of the first voltage and the second voltage generated by the voltage generating unit 5 such that the grating 2 is in a transparent state during the 2D display phase and is shown as alternately arranged light-shielding areas and light-transmitting areas during the 3D display phase. In the implementation where the grating 2 comprises electrochromic layers 23, the control unit 4 can control the values of the first voltage and the second voltage generated by the voltage generating unit 5 such that the electrochromic layers 23 are in a transparent state during the 2D display phase and is in a light-shielding state during the 3D display phase. During a touch phase, the touch sensing unit 6 is configured to, under the control of the control unit 4, provide touch scanning signals to the electrode blocks of the second electrode 22, and to determine a touch position according to the feedback signals provided by the electrode blocks.

The display panel 1 may usually comprise an array substrate 11, a colour film substrate 12 and liquid crystal molecules 13 arranged between the array substrate 11 and the colour film substrate 12. On the light-emitting side of the grating 2 there can be arranged protective glass, namely cover plate glass 3. The values of the first voltage and the second voltage generated by the voltage generating unit 5 are not sole constant numbers, but can be controlled by the control unit 4 according to different needs. Each electrode block of the second electrode 22 is equivalent to the coordinates of a touch point and is a self-capacitance electrode.

To sum up, the display device according to the above embodiment can not only provide 2D and 3D display, but also have a touch functionality. In particular, the second electrode 22 is used to adjust the light-shielding area of the grating 2 so as to switch between 2D and 3D display, and meanwhile is also used to implement the touch function of the display device, that is to say, the second electrode 22 is equivalent to a touch electrode (self-capacitance electrode). Thus, the second electrode 22 functions as both a display electrode and a touch electrode and has the advantages of reduced thickness, lower cost and enhanced transmittance in comparison with the prior display devices having 2D, 3D and touch display functions.

Optionally, the first electrode 21 in the embodiment is a planar electrode, which can not only be easily produced, but also has a simple wiring layout and easily controlled time sequencing.

Optionally, the voltage generating unit 5 comprises a first voltage generating module 51 and a second voltage generating module 52. The first voltage generating module 51 is configured to generate the first voltage for the first electrode 21; and the second voltage generating module 52 is configured to generate the second voltage for the second electrode 22. In such a way, the generated first voltage and second voltage can be controlled separately without mutual interference.

Optionally, the state of the electrochromic layers 23 are controlled by the electric field between the first electrode 21 and the second electrode 22. As an implementation, the value of the first voltage is equal to that of the second voltage during the 2D display phase. At this time, there is no electric field between the first electrode 21 and the second electrode 22, the electrochromic layers 23 are in a transparent state (i.e., the gratings 2 are all in the transparent state). When the light from the display panel 1 transmits through the grating 2, a 2D image can be displayed as there is no grating at all.

During a 3D display phase, the value of the first voltage is not equal to that of the second voltage, there is formed an electric field between the first electrode 21 and the second electrode 22. At this time, the electrochromic layers 23 are in a light-shielding state so as to form the light-shielding areas on the grating 2, and those parts that have no electrochromic layers 23 form light-transmitting areas. The light from the display panel 1 can form a 3D image under the action of the grating 2.

Optionally, the display panel 1 may comprise a plurality of pixel units arranged in rows and columns, and the electrochromic layer 23 has a width that is the same as that of the pixel unit and is arranged in a position corresponding to that of the pixel unit in the vertical direction. That is, each column of the electrochromic layers 23 corresponds to a column of pixel units. The naked-eye 3D display function can be realized through reasonable arrangement of the electrochromic layers 23 and the pixel units.

In a specific embodiment, the plurality of electrode blocks of the second electrode 22 may be arranged in rows and columns with each electrode block being connected with the touch sensing unit by a single lead. During the touch phase, touch scanning signals are output to each electrode block. When one of the electrode blocks senses a touch, it can pass the feedback signals through the single lead connected therewith to the touch sensing unit so as to accurately determine the touch position.

In a specific embodiment, the gap between any two adjacent columns of the electrode blocks corresponds to that between two adjacent columns of the pixel units, and the leads that are connected with the electrode blocks in the same column are arranged in the gap between two adjacent columns of the electrode blocks. Since the gap between two adjacent columns of the electrode blocks is a non-light-transmitting area, the arrangement of the leads therein can prevent the leads from affecting the aperture ratio of the display panel 1.

In a specific embodiment, during the touch phase, the touch sensing unit 6 inputs the touch scanning signals into each column of the electrode blocks in turn, wherein when the touch scanning signals are input into one column of the electrode blocks, the rest columns of the electrode blocks are maintained at the second voltage. At this time, there is no need to arrange a plurality of signal output ports on the touch sensing unit 6, which results in simple wiring layout, easy implementation and lower costs.

Optionally, the display device can also comprise an on/off switch unit 7, which is configured to, under the control of the control unit 4, transmit the second voltage provided by the voltage generating unit 5 to the second electrode 22, or transmit the touch scanning signals output by the touch sensing unit 6 to the second electrode 22. It can thus be seen that the on/off switch unit 7 can switch between the input of the voltage signals of the second electrode 22 during the touch phase and that during the display phase.

Figure 3:
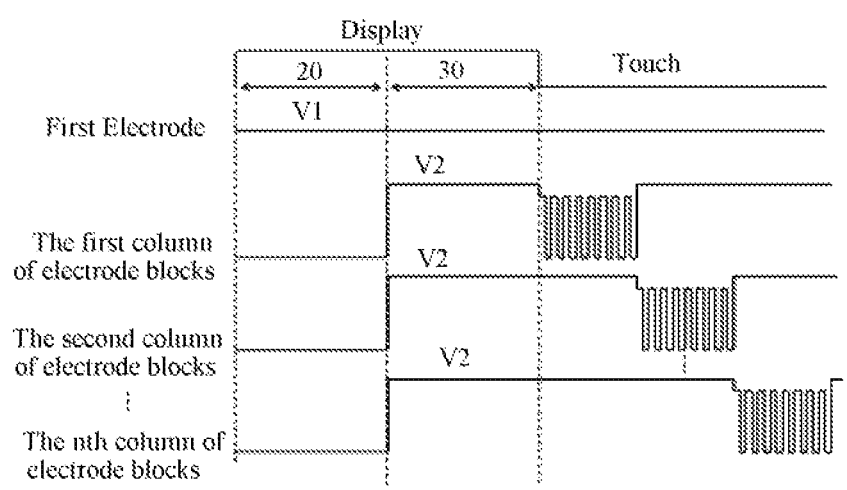
FIG. 3 is a time sequencing diagram of a method for driving the display device according to another embodiment of the present invention.

A method for driving a display device is provided according to another embodiment of the present invention, wherein the display device can be the one as shown in FIGS. 1 and 2. With reference to FIG. 3, the driving method comprises:

First, during the display phase, inputting a first voltage to a first electrode 21 and inputting a second voltage to a second electrode 22, and achieving a 2D or 3D display by controlling the values of the first and second voltages.

Specifically, the display phase can comprise a 2D display stage and a 3D display stage. In the 2D display stage, the value of the first voltage is equal to that of the second voltage. At this time, there is no electric field between the first electrode 21 and the second electrode 22, the electrochromic layers 23 are in a transparent state, i.e., the gratings 2 are all in the transparent state. When the light from the display panel 1 transmits through the gratings 2, a 2D image can be displayed because of the absence of the gratings 2. During a 3D display phase, the value of the first voltage is not equal to that of the second voltage, there is formed an electric field between the first electrode 21 and the second electrode 22. At this time, the electrochromic layers 23 are in a light-shielding state so as to form the light-shielding areas on the gratings 2, and those parts of the gratings 2 that have no electrochromic layers 23 form light-transmitting areas. When the light from the display panel 1 passes through the gratings 2, a 3D image can be displayed under the action of the gratings 2.

During the touch phase, the next step includes providing touch scanning signals to the electrode blocks of the second electrode 22, and determining a touch position according to feedback signals provided by the electrode blocks.

To be specific, the touch phase occurs after the display of a frame of a 2D image or 3D image. Then, the touch scanning signals are provided to the electrode blocks of the second electrode 22 and the touch position can be determined according to the feedback signals provided by the electrode blocks.

As an optional embodiment during the touch phase, the touch scanning signals are inputted into each column of the electrode blocks in turn, wherein when the touch scanning signals are input into one column of the electrode blocks, the second voltage is input into the rest columns of the electrode blocks. Then the signals of the electrode blocks applied with the touch scanning signals are to be analyzed so as to determine whether a touch occurs. The electrode blocks that are not applied with the touch scanning signals are still maintained at the voltage as during the display phase so as to guarantee the display of the original image. By inputting the touch scanning signals on a column-by-column basis, there is no need to arrange a plurality of signal output ports on the touch sensing unit 6, which results in simple wiring layout, easy implementation and lower costs.

It may be appreciated that the above embodiments are only exemplary for the sake of explaining the principle of the present invention, and the present invention should not be limited thereto. As far as those skilled in the art are concerned, various variations and modifications can be made without departing from the spirit and nature of the present invention and shall be deemed as falling within the protection scope of the present invention. The protection scope of the present invention depends on the protection scope of the appended claims.

The term "and/or" used herein is only used to describe the connecting relations between objects connected thereby, which may be of three types. For instance, "A and/or B" can represent the following three conditions: either A alone, or B alone, or both A and B. In addition, the character "/" used herein often indicates that the former and the latter objects connected thereby is in a "or" relationship.

The words, such as "first", "second" and "third", are used in the present application. Such a word is not intended to imply ordering but for the sake of identification, unless in a certain context. For instance, the expressions "the first version" and "the second version" do not necessarily mean that the first version is just the No. 1 version or created prior to the second version, or the first version is required or operated before the second version. In fact, these expressions are used to identify the different versions.

In the claims, any reference numeral in parentheses should not be interpreted as a limitation to the claims. The term "comprise" does not exclude the presence of elements or steps other than those listed in the claims. The words "a" or "an" in front of elements do not exclude the possibility of a plurality of such elements. The present invention can be carried out by means of hardware comprising a plurality of separate elements, or by appropriately programmed software or firmware, or by any combination thereof.

In device or system claims that enumerate several means, one or more of the means can be embodied by one and the same item of hardware. The mere fact that some measure is recited in dependent claims that are different from each other does not indicate that the combination of the measures cannot be used to advantage.

The invention claimed is:

1. A display device, comprising:
   a display panel and a grating mating with the display panel, the display device further comprising a voltage generating unit, a touch sensing unit and a control unit; wherein
   the grating comprises a first electrode and a second electrode having a plurality of electrode blocks sequentially arranged at the light-emitting side of the display panel;
   wherein the voltage generating unit is configured to provide a first voltage to the first electrode and a second voltage to the second electrode;
   wherein the control unit is configured to control the values of the first voltage and the second voltage generated by the voltage generating unit such that the grating is in a transparent state during a 2D display phase and is shown as alternately arranged light-shielding areas and light-transmitting areas during a 3D display phase; and
   wherein, during a touch phase, the touch sensing unit is configured to provide touch scanning signals to the electrode blocks of the second electrode under the control of the control unit, and to determine a touch position according to feedback signals provided by the electrode blocks.

2. The display device according to claim 1, wherein the grating comprises:
   at the position of the light-shielding area between the first electrode and the second electrode, electrochromic layers which are in a transparent state during the 2D display phase and are in a light-shielding state during the 3D display phase.

3. The display device according to claim 2, wherein the display panel comprises:
   a plurality of pixel units arranged in rows and columns, and wherein the electrochromic layer has a width that is the same as that of the pixel unit and is arranged in a position corresponding to that of the pixel unit in the vertical direction.

4. The display device according to claim 3, wherein the plurality of electrode blocks of the second electrode are arranged in rows and columns with each electrode block being connected with the touch sensing unit by a single lead.

5. The display device according to claim 4, wherein a gap between any two adjacent columns of the electrode blocks corresponds to that between two adjacent columns of the pixel units, and wherein the leads that are connected with the electrode blocks in the same column are arranged in the gap between two adjacent columns of the electrode blocks.

6. The display device according to claim 4, wherein, during the touch phase, the touch sensing unit inputs the touch scanning signals into each column of the electrode blocks in turn, and wherein when the touch scanning signals are input into one column of the electrode blocks, remaining columns of the electrode blocks are maintained at the second voltage.

7. The display device according to claim 1, wherein the display device further comprises an on/off switch unit,
   wherein the on/off switch unit is configured to, under the control of the control unit, transmit the second voltage provided by the voltage generating unit to the second electrode, or transmit the touch scanning signals output by the touch sensing unit to the second electrode.

8. The display device according to claim 1, wherein the voltage generating unit comprises a first voltage generating module and a second voltage generating module;
   the first voltage generating module is configured to generate the first voltage for the first electrode; and
   the second voltage generating module is configured to generate the second voltage for the second electrode.

9. The display device according to claim 1, wherein during the 2D display phase, the value of the first voltage is equal to that of the second voltage; and during the 3D display phase, the value of the first voltage is not equal to that of the second voltage.

10. The display device according to claim 1, wherein the first voltage is a planar voltage.

11. A method for driving a display device, wherein the display device comprises a display panel, a grating mating with the display panel, a voltage generating unit, a touch sensing unit and a control unit;
    wherein the grating comprises a first electrode and a second electrode having a plurality of electrode blocks sequentially arranged at the light-emitting side of the display panel;
    wherein the voltage generating unit is configured to provide a first voltage to the first electrode and a second voltage to the second electrode;
    wherein the control unit is configured to control the values of the first voltage and the second voltage generated by the voltage generating unit such that the grating is in a transparent state during a 2D display phase and is shown as alternately arranged light-shielding areas and light-transmitting areas during a 3D display phase; and
    wherein, during a touch phase, the touch sensing unit is configured to provide touch scanning signals to the electrode blocks of the second electrode under the control of the control unit, and to determine a touch position according to feedback signals provided by the electrode blocks,
    the method comprising the steps of:
    during the display phase, inputting a first voltage to a first electrode and inputting a second voltage to a second electrode, and achieving a 2D or 3D image display by controlling the values of the first and second voltages;
    during the touch phase, providing touch scanning signals to the electrode blocks of the second electrode, and determining a touch position according to feedback signals provided by the electrode blocks.

12. The method of claim 11, wherein the grating comprises at the position of the light-shielding area between the first electrode and the second electrode, electrochromic layers which are in a transparent state during the 2D display phase and are in a light-shielding state during the 3D display phase.

13. The method of claim 11, wherein the display panel comprises a plurality of pixel units arranged in rows and columns and wherein the electrochromic layer has a width that is the same as that of the pixel unit and is arranged in a position corresponding to that of the pixel unit in the vertical direction.

14. The method of claim 11, wherein the plurality of electrode blocks of the second electrode are arranged in rows and columns with each electrode block being connected with the touch sensing unit by a single lead.

15. The method of claim 11, wherein a gap between any two adjacent columns of the electrode blocks corresponds to that between two adjacent columns of the pixel units, and wherein the leads that are connected with the electrode blocks in the same column are arranged in the gap between two adjacent columns of the electrode blocks.

16. The method of claim 11, wherein, during the touch phase, the touch sensing unit inputs the touch scanning signals into each column of the electrode blocks in turn and wherein when the touch scanning signals are input into one column of the electrode blocks, the rest of the columns of the electrode blocks are maintained at the second voltage.

17. The method of claim 11, wherein the display device further comprises an on/off switch unit, wherein the on/off switch unit is configured to, under the control of the control unit, transmit the second voltage provided by the voltage generating unit to the second electrode, or transmit the touch scanning signals output by the touch sensing unit to the second electrode.

18. The method of claim 11, wherein the voltage generating unit comprises a first voltage generating module and a second voltage generating module;

the first voltage generating module is configured to generate the first voltage for the first electrode; and the second voltage generating module is configured to generate the second voltage for the second electrode.

19. The method of claim 11, wherein during the 2D display phase, the value of the first voltage is equal to that of the second voltage; and during the 3D display phase, the value of the first voltage is not equal to that of the second voltage.

20. The method of claim 11, wherein the first voltage is a planar voltage.

* * * * *